Patented Aug. 24, 1937

2,090,738

UNITED STATES PATENT OFFICE 2,090,738

PROCESS OF PURIFYING OIL AND VITAMIN FRACTIONS THEREOF

Arthur O. Tischer, Rochester, N. Y., assignor, by mesne assignments, to Eastman Kodak Company, Jersey City, N. J., a corporation of New Jersey No Drawing. Application July 10, 1935, Serial No. 30,765

21 Claims. (Cl. 87—12)

This invention relates to the purification of natural organic products, such as vegetable and animal oils, fats, waxes and the like, and more particularly, to the removal from such products of certain constituents giving rise to undesirable taste and odors.

Oils, fats and the like substances of plant and animal origin consist of glycerides of fatty acids, mixed with amines, proteins and their decomposition products and high molecular weight saturated and unsaturated free fatty acids. As is well known, the fish oils have highly characteristic odor and taste, and it is believed that the saturated and unsaturated free fatty acids, together with amines and amino-acids, are responsible for these undesirable characteristics. The highly-unsaturated free fatty acids are believed to be destructive to the vitamins A and D, present in certain oils, this probably being due to the readiness of such acids to form oxidation products when exposed to atmospheric conditions. Furthermore the acids are known to exert an irritant action on the digestive tracts of human beings, especially of children.

A satisfactory removal of odors and an improvement in taste, especially of the vitamin-rich animal oils, is of considerable importance. Oils for human consumption should preferably be tasteless and odorless while those for the manufacture of soap should be practically free of odor.

The problem of removing undesirable odors and tastes from edible and medicinal oils and fats has existed for a considerable period of time and various attempts looking toward the solution of the problem have been made, but until the advent of the invention to be described hereinafter, none of such methods have achieved complete or commercial success, and they have often involved procedures which adversely affected the therapeutic value and other characteristics of the materials dealt with. For example, it has been proposed, in British Patents 382,060 and 385,774, to remove odors and tastes from cod-liver oil by hydrogenation in the presence of a metal catalyst at a temperature of approximately 100° and a pressure of several atmospheres. This is a relatively expensive procedure and one which entails a partial loss of vitamines. Rosenstein and Hund, in the United States Patent 1,885,859, have attempted the removal of free fatty acids by extraction with toxic alkylol amine solvents and their mixtures. More recently, vacuum distillation method has been applied to the purification and concentration of the vitamine content of fish oils and other oils of animal and vegetable origin, but, while this does result in a very considerable improvement in the odor and taste of such materials, is not always convenient or commercially feasible to remove all traces of the above mentioned constituents which give rise to the undesirable taste and odor.

The present invention has for its object to overcome the deficiencies of hitherto known purification processes for the treatment of substances of animal and vegetable oils, fats, waxes and the like, and to provide a process whereby such materials may be purified and improved in taste and odor without adversely affecting their medicinal and therapeutic value. A further object is to provide a process for the purification of oils and fatty bodies by a process which avoids heating the materials to any considerable extent, or subjecting them to drastic chemical action. A still further object is to provide a process for improving the taste of and deodorizing fish oils. Another object is to provide a process for the purification of such materials, whereby those constituents giving rise to undesirable taste and odor may be removed partially or substantially completely and without deleterious contamination of the treated material and without destroying the vitamin content thereof. A specific object is to provide a process for the purification and refining of fish oils such as cod-liver and halibut-liver oils, salmon oil, and the like, and to provide a highly refined oil of satisfactory taste, odor and purity. Other objects will appear hereinafter.

These objects are accomplished by the following invention which, in its broader aspects, comprises extracting the undesirable constituents, such as amine bodies, proteins, and their decomposition products, and high molecular weight saturated and unsaturated bodies free fatty acids, by contacting the oily or fatty materials with a cyclic aldehyde, such as furfural or a furfural derivative such as methyl or ethyl furfural, and thereafter separating the extractant containing the dissolved constituents from the material being treated.

In a variation of the process the furfural or furfural derivative is combined with a neutral solvent such for instance as heptane, the action of which is to decrease the mutual solubility of the oil and the furfural without, however, substantially decreasing the solubility of the impurities in the latter.

In the following examples and description, I have set forth several of the preferred embodiments of my invention, but it is to be understood that they are included merely for purposes of illustration and not as a limitation thereof.

In carrying out my invention, the material to be treated may be brought in contact with the treating liquid in any convenient manner which assures thorough mixing and efficient extraction. The oil or fatty material may, for example, be agitated with varying amounts of the extractant, in separating device such as a separatory funnel the resulting emulsion or mixture being then permitted to separate into two layers, after which the extractant containing the dissolved constituents is removed. Another convenient procedure is to pass the oily or fatty material counter-currently to a stream of extractant in any of the conventional forms of counter-current extraction apparatus. The extractant picking up the impurities and other constituents to be dissolved out as effectively in this way as by the separation method.

*Example 1.*—The treatment of dogfish oil is used for the first example because, although it is as yet a relatively unimportant commercial fish oil, it is one of the most malodorous and contains a high percentage of free fatty acids and other impurities. 200 cc. of dogfish oil containing 6.8% free fatty acids is shaken with an equal volume of furfural for 30 minutes in a separatory funnel. After standing for approximately one hour, the emulsion thus formed separates sharply into two layers, the furfural containing the dissolved impurities comprising the lower (heavier) layer and the purified oil, the upper (lighter) layer. The furfural layer is then drawn off and subjected to distillation which provides a distillate of furfural sufficiently purified for reuse, the residue representing the saturated and unsaturated free fatty acids, amine bodies and other undesirable substances extracted from the oil.

The oil layer is then drawn off and may be subjected to high vacuum, to remove minute traces of furfural. If it is desired, the removal of the furfural may be secured by shaking with a 2% solution of sodium bisulfite in water. The oil is then preferably dried under a vacuum which also removes the last traces of sulphur dioxide.

*Example II.*—500 cc. of cod liver oil is passed counter-currently to an equal volume of furfural in a counter-current extraction apparatus of conventional design, the furfural extractant being removed from the bottom of the apparatus, while the purified oil is removed at the top. Analysis of the original oil indicates a free fatty acid content of 2.08%, whereas the acid content of the treated oil is found to be only 0.13%, representing substantially complete removal of this undesirable constituent.

In carrying out this form of my invention, the furfural is conveniently led from the extraction apparatus to a fractionating column where the furfural is distilled from its impurities and recirculated through the counter-current extractor.

*Example III.*—The furfural extraction process is especially valuable for the purification of high vitamin fractions, such as those obtained in the molecular distillation of fish oil. In treating a concentrate of this type, 200 cc. of a first or second fraction obtained from cod liver oil according to the process described in the U. S. patent to Hickman, No. 1,925,559, is treated substantially as described in Examples I and II. As illustrating the marked improvement in reduction of fatty acid content, the concentrate before extraction contained 36.65% free fatty acid (calculated as oleic acid) and after three extractions this was reduced to 1.68%.

*Example IV.*—500 cc. of salmon oil is passed counter-currently to an equal volume of methyl furfural in a counter-current extraction apparatus. The methyl furfural is removed from bottom of the apparatus, while the purified oil is removed at the top, as in Example II. The taste and odor of the oil is greatly improved by this treatment.

*Example V.*—200 cc. of crude linseed oil is agitated with an equal volume of furfural for 30 to 60 minutes in a separatory funnel. After standing for an hour or longer, the resulting emulsion separates into two layers, the lower furfural layer containing the impurities extracted from the crude oil, and the upper layer consisting of the purified linseed oil. A substantial improvement in the oil by removal of the free saturated and unsaturated fatty acids results.

*Example VI.*—500 cc. of vitamin A and D concentrate obtained by high vacuum distillation of a fish liver oil, of an objectionable odor and bitter taste and having an acid value of 12.3 percent, are dissolved in 500 cc. of heptane. This oil solution is then extracted by means of a continuous extractor or by simply shaking in a separatory funnel three times with 500 cc. of freshly distilled furfural. The object of dissolving the concentrate in heptane is that it tends to keep desirable products in solution and reduces considerably the solubility of furfural in the oil so that smaller quantities of these may be employed. After extraction and complete removal of the furfural and heptane, the acid value was found to be 0.93 percent. The objectionable odor as well as the bitter taste due to products of oxidation and polymerization are substantially completely removed by this procedure. The vitamin A concentration is undiminished.

It will be evident that many changes may be made in the procedure outlined in the above examples within the scope of my invention. In such modifications, due consideration will of course be given to the particular material undergoing treatment. For example, in dealing with some of the fatty bodies, such as certain fats and waxes, it will be necessary to warm the material slightly to bring it into a liquid form in which it may be efficiently handled in the counter-current or other extraction procedure and it will likewise be necessary to maintain the temperature at a sufficient degree in order to keep the material undergoing treatment in an easily mobile condition.

Although in the above described operations I have referred to the use of equal volumes of extractant and oily or fatty material, the particular amount of extractant is not critical and may be varied within wide limits as desired. In general, I prefer to use equal volumes of oil and extractant, or in any event a sufficient excess of the extractant to provide for efficient solution of the components of the oil which it is desired to remove.

It will also be evident that the various oils and fatty bodies differ among themselves as to their solubility in a given extractant such as furfural or its derivatives, and in some cases it may be necessary to add to the mixture a liquid or substance which reduces the solubility of the oil in the extractant or vice versa, such as the heptane mentioned above, or to dissolve the substance undergoing treatment in the heptane or other liquid. Such substances should not, of course, adversely effect the solubility of the constituents of the oil which it is desired to extract.

Although I have found it convenient to describe my process by reference to the treatment of specific oils, it is broadly applicable to the purification, deodorization and improvement in taste of a wide variety of materials including the fish body and liver oils, whale oil and sperm oil, vegetable oils, such as cottonseed, linseed, cocoanut, rapeseed, wheat germ, and other oils, and such fatty materials as mutton fat, beef tallow.

While I do not confine myself to any particular theory or explanation of the manner in which my invention operates, it is probable that the effectiveness of a cyclic aldehyde such as furfural or its derivatives in removing odours from oils and fatty substances is due to its aldehydic nature and the fact that such compounds readily combine with the amines and decomposition products, polymerization products, etc., which are thought to be largely responsible for the bad odor of fish oils and allied substances. In any event, I have effectively demonstrated that furfural and its derivatives have the ability to selectively remove individual components such as amine bodies, free fatty acids and the like from such materials.

The herein described invention constitutes a simple, economical and highly effective solution of the vexatious and difficult problem of deodorizing and improving the taste of animal and vegetable oils and fats, particularly the fish oils which, in their natural, unrefined condition, are especially offensive from the standpoint of taste and odor. Furfural and its derivatives are especially valuable because of their non-toxic nature and, since most of the animal and vegetable oils are insoluble therein, the extractant may be almost quantitatively recovered. Not only is furfural a low priced material, but it has no deleterious effect upon the vitamin content of the oils treated therewith. Outstanding advantages of the herein described process are that treatment of the oils and fatty materials with objectionable chemical substances is avoided, excessive heating with its consequent destructive effect upon the vitamins and other valuable components of the materials undergoing treatment is eliminated, and there is no necessity for the use of more or less complicated apparatus and involved manipulation.

What I claim is:

1. In the process of purifying a substance of the class of animal and vegetable oils, fats and waxes, and concentrated fat soluble vitamin fractions thereof, the step which comprises extracting the impurities from the material to be treated by contacting the material with an aldehyde having a furane nucleus.

2. In the process of purifying a substance of the class of animal and vegetable oils, fats and waxes and concentrated fat soluble vitamin fractions thereof, the step which comprises extracting the impurities from the material to be treated by contacting the material with furfural.

3. In the process of purifying a substance of the class of animal and vegetable oils, fats and waxes and concentrated fat soluble vitamin fractions thereof, the step which comprises extracting the impurities from the material to be treated by contacting the material with a furfural derivative.

4. In the process of purifying a substance of the class of animal and vegetable oils, fats and waxes and concentrated fat soluble vitamin fractions thereof, adapted for use as therapeutic agents, the step which comprises extracting the impurities from the material to be treated by contacting the material with methyl furfural.

5. The process of purifying a substance of the class of animal and vegetable oils, fats and waxes and concentrated fat soluble vitamin fractions thereof, adapted for use as therapeutic agents, which comprises extracting the impurities from the material to be treated by contacting the material with furfural and separating the furfural containing the extracted impurities from the material being treated.

6. The process of purifying a substance of the class of animal and vegetable oils, fats and waxes and concentrated fat soluble vitamin fractions thereof, adapted for use as therapeutic agents, which comprises extracting the impurities from the material to be treated by contacting the material with a furfural derivative and separating the furfural derivative containing the extracted impurities from the material.

7. The process of purifying a substance of the class of animal and vegetable oils, fats and waxes and concentrated fat soluble vitamin fractions thereof, adapted for use as therapeutic agents, which comprises extracting the impurities from the material to be treated by agitating it with an equal volume of furfural, permitting the resulting mixture to form an oily layer and a layer of furfural containing the extracted impurities and separating the furfural layer containing the extracted impurities from the oily layer.

8. The process of purifying a substance of the class of animal and vegetable oils, fats and waxes, and concentrated fat soluble vitamin fractions thereof, adapted for use as therapeutic agents, which comprises extracting the impurities from the material to be treated by agitating it with an equal volume of furfural, permitting the resulting mixture to form an oily layer and a layer of furfural containing the extracted impurities and separating the furfural layer from the oily layer and recovering the furfural by distillation.

9. The continuous process of purifying a substance of the class of animal and vegetable oils, fats and waxes and concentrated fat soluble vitamin fractions thereof, adapted for use as therapeutic agents, which comprises passing the material to be treated counter-current to a stream of an aldehyde having a furane nucleus, recovering the aldehyde and returning it to the process.

10. The continuous process of purifying a substance of the class of animal and vegetable oils, fats and waxes and concentrated fat soluble vitamin extracts thereof, adapted for use as therapeutic agents, which comprises passing the material to be treated counter-current to a stream of furfural, recovering the furfural and returning it to the process.

11. The continuous process of purifying a substance of the class of animal and vegetable oils, fats and waxes and concentrated fat soluble vitamin extracts thereof, adapted for use as therapeutic agents, which comprises passing the material to be treated counter-current to a stream of methyl furfural, recovering the methyl furfural and returning it to the process.

12. The continuous process of purifying a substance of the class of animal and vegetable oils, fats and waxes and concentrated fat soluble vitamin extracts thereof, which comprises passing the material to be treated dissolved in normal heptane counter-current to a stream of furfural.

13. The process of purifying an animal oil which comprises contacting the oil or a fraction thereof with furfural and separating the furfural containing the extracted impurities.

14. The process of purifying a vegetable oil or fraction thereof which comprises contacting the oil or its fraction with furfural and separating the furfural containing the extracted impurities.

15. The process of purifying a fish oil which comprises washing the fish oil with an aldehyde having a furane ring and separating the aldehyde containing the extracted impurities.

16. The process of purifying a fish oil containing fat soluble vitamins which comprises contacting the oil with furfural or a derivative of furfural and separating the furfural extract containing the extracted impurities.

17. The process of purifying a fish oil containing fat soluble vitamins which comprises extracting the impurities with furfural.

18. The process of purifying a fraction of an animal oil containing fat soluble vitamins which comprises contacting the fraction with an aldehyde having a furane ring and separating the aldehyde containing the dissolved impurities.

19. The process of purifying a fat soluble vitamin containing extract of a fish oil which comprises contacting the fraction with an aldehyde selected from the group consisting of furfuraldehyde and its derivatives and separating the aldehyde containing the extracted impurities.

20. The process of purifying a fat soluble vitamin containing fraction of a fish oil which comprises contacting the fraction with furfural and separating the furfural containing the extracted impurities.

21. The process which comprises contacting a fat soluble vitamin concentrate with furfural, removing the furfural containing extracted impurities and subjecting the extracted concentrate to reduced pressure to remove residual furfural.

ARTHUR O. TISCHER.